US009744894B2

(12) United States Patent
Carlioz et al.

(10) Patent No.: US 9,744,894 B2
(45) Date of Patent: Aug. 29, 2017

(54) ADJUSTABLE FOOTREST ASSEMBLY

(71) Applicant: Zodiac Seats US LLC, Gainesville, TX (US)

(72) Inventors: Victor Carlioz, Rumilly (FR); Alexandre Dufour, Lausanne (CH)

(73) Assignee: Zodiac Seats US LLC, Gainesville, TX (US)

( * ) Notice: Subject to any disclaimer, the term of this patent is extended or adjusted under 35 U.S.C. 154(b) by 232 days.

(21) Appl. No.: 14/431,474

(22) PCT Filed: Sep. 26, 2013

(86) PCT No.: PCT/US2013/061835
§ 371 (c)(1),
(2) Date: Mar. 26, 2015

(87) PCT Pub. No.: WO2014/052534
PCT Pub. Date: Apr. 3, 2014

(65) Prior Publication Data
US 2015/0274053 A1 Oct. 1, 2015

Related U.S. Application Data

(60) Provisional application No. 61/705,796, filed on Sep. 26, 2012.

(51) Int. Cl.
*B60N 3/06* (2006.01)
*B64D 11/06* (2006.01)

(52) U.S. Cl.
CPC .............. *B60N 3/063* (2013.01); *B64D 11/06* (2013.01); *B64D 11/0643* (2014.12); *Y02T 50/46* (2013.01)

(58) Field of Classification Search
CPC ...... B60N 3/063; B64D 11/0643; B64D 11/06
(Continued)

(56) References Cited

U.S. PATENT DOCUMENTS 3,232,136 A * 2/1966 Bahmuller ............. A47C 1/026
297/366
3,779,655 A * 12/1973 Toyota ................... A47C 1/026
403/93
(Continued)

FOREIGN PATENT DOCUMENTS

EP 0751038 A2 1/1997

OTHER PUBLICATIONS

International Patent Application No. PCT/US2013/061835, International Preliminary Report on Patentability dated Apr. 9, 2015.
(Continued)

*Primary Examiner* — Anthony D Barfield
(74) *Attorney, Agent, or Firm* — Kilpatrick Townsend & Stockton LLP; Dean W. Russell; Tiffany L. Williams

(57) ABSTRACT

Footrest assembly for a passenger seat having a saddle (22) and a post (16) pivotally coupled to a fastener (38) connected to the saddle. A ratcheting mechanism (86) with at least one tooth (88) is positioned on a first end (20) of the post and a pawl (90) is pivotally coupled to a pawl shaft (98) fixedly coupled to the saddle. A cam follower (96) is pivotally coupled to the fastener and positioned within a slot (106) formed in the end of the post in order to prevent the pawl from engaging with a tooth while pivoting in a direction of a fully deployed position of the assembly.

19 Claims, 16 Drawing Sheets

(58) Field of Classification Search
USPC .................................................. 297/423.26
See application file for complete search history.

(56) References Cited

U.S. PATENT DOCUMENTS 5,169,257 A    12/1992  Liou
2009/0322139 A1    12/2009  Clough

OTHER PUBLICATIONS

International Patent Application No. PCT/US2013/061835, Search Report and Written Opinion dated Jan. 3, 2014.

* cited by examiner

ADJUSTABLE FOOTREST ASSEMBLY

CROSS REFERENCE TO RELATED APPLICATIONS

This application is the U.S. national phase entry of International Application Serial No. PCT/US2013/061835 ("the '835 application"), filed on Sep. 26, 2013, entitled ADJUSTABLE FOOTREST ASSEMBLY, which application is related to and claims priority benefits from U.S. Provisional Application Ser. No. 61/705,796 ("the '796 application"), filed on Sep. 26, 2012, entitled SINGLE POST FOOTREST. The '796 and '835 applications each are hereby incorporated in their entireties by this reference.

FIELD OF THE INVENTION

The invention relates to footrests for passenger seats or the like.

BACKGROUND

Many vehicle seats, such as those on passenger aircraft, buses, trains, and the like have installed thereon a footrest for the comfort of passengers. In many cases, these footrests are installed on an aft surface of each passenger seat for the use by a passenger seated in the next-aft passenger seat. Conventionally, these footrests were designed to rotate from a deployed position below the passenger seat (similar to the position shown in FIG. 4) to a stowed position adjacent a passenger seat back (similar to the position shown in FIG. 5).

In many cases, these pivoting footrests were designed with a post on each side and a bar connecting the two posts so that the footrest pivoted from two locations and had stability from the dual post design.

However, in an effort to reduce the weight associated with the dual post design, as well as to provide a slimmer design that is less intrusive in passenger space, a single post footrest design was developed, such as the version illustrated in FIGS. 1-2. This design includes a single post pivotally connected to a saddle with two paddles extending from either side of the single post. To control the movement of the post, a dual ratchet mechanism and a dual friction mechanism are included on each side of the single post adjacent the pivotal connection of the post to the saddle. The dual mechanisms were needed to provide stability to the single post design during use, but create additional weight and the additional mechanical parts create additional maintenance issues.

Thus, it is desirable to provide a single post footrest design that provides a light weight structure that eliminates the need for dual ratchet and friction mechanisms, while also providing sufficient rigidity and stability to the footrest design.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a footrest assembly for a passenger seat comprises a fixed portion comprising an upper portion configured to couple to the passenger seat and a lower portion comprising a pair of parallel surfaces, a deployable portion comprising a post, a fastener fixedly coupled to the pair of parallel surfaces and passing through an aperture in an end of the post, wherein the post is pivotally coupled to the fastener, a ratcheting mechanism comprising at least one tooth positioned on the end of the post and a pawl pivotally coupled to a pawl shaft fixedly coupled to the pair of parallel surfaces, and a cam follower pivotally coupled to the fastener and positioned within a slot formed in the end of the post.

In certain embodiments, the footrest assembly further comprises at least one bushing, wherein a portion of the at least one bushing is inserted within an aperture in at least one of the pair of parallel surfaces, wherein an outer shape of the portion of the at least one bushing is configured to interlock with an inner shape of the aperture. The at least one bushing may include a flange portion configured to be positioned adjacent an interior side of one of the pair of parallel surfaces.

The slot in the post may further comprise a cam engaging surface and the cam follower may further comprise two locking sides, wherein rotation of the cam follower is controlled by rotation of the post when the cam engaging surface contacts one of the two locking sides.

According to certain embodiments, a spring is coupled to the pawl shaft that is configured to apply force to engage the pawl with the at least one tooth to prevent rotation of the post in a direction of a fully deployed position, and the cam follower is configured to apply force to disengage the pawl from the at least one tooth to allow rotation of the post from a stowed position to the fully deployed position.

The fastener may be a bolt that is secured to the pair of parallel surfaces with a nut positioned proximate the at least one bushing. At least a pair of washers may also be included with the footrest assembly, wherein each washer is positioned within a groove on each side of opposing sides of the end of the post.

According to certain additional embodiments, a footrest assembly for a passenger seat comprises a fixed portion comprising a pair of parallel surfaces, a deployable portion comprising a post, a fastener fixedly coupled to the pair of parallel surfaces and passing through an aperture in an end of the post, wherein the post is pivotally coupled to the fastener, at least a pair of washers, each washer positioned adjacent opposing sides of the end of the post, at least one bushing positioned adjacent one of the washers, a ratcheting mechanism comprising at least one tooth positioned on the end of the post and a pawl pivotally coupled to a pawl shaft fixedly coupled to the pair of parallel surfaces, and a cam follower pivotally coupled to the fastener and positioned within a slot formed in the end of the post.

According to certain further embodiments, a footrest assembly for a passenger seat comprises a saddle, a post, wherein an end of the post is pivotally coupled to a fastener connected to the saddle, at least one bushing coupled to the fastener, wherein a portion of the at least one bushing is inserted within an aperture in the saddle, wherein an outer shape of the portion of the at least one bushing is configured to interlock with an inner shape of the aperture, a ratcheting mechanism comprising at least one tooth positioned on the end of the post and a pawl pivotally coupled to a pawl shaft fixedly coupled to the saddle, and a cam follower pivotally coupled to the fastener and positioned within a slot formed in the end of the post.

DETAILED DESCRIPTION

Figure 1:
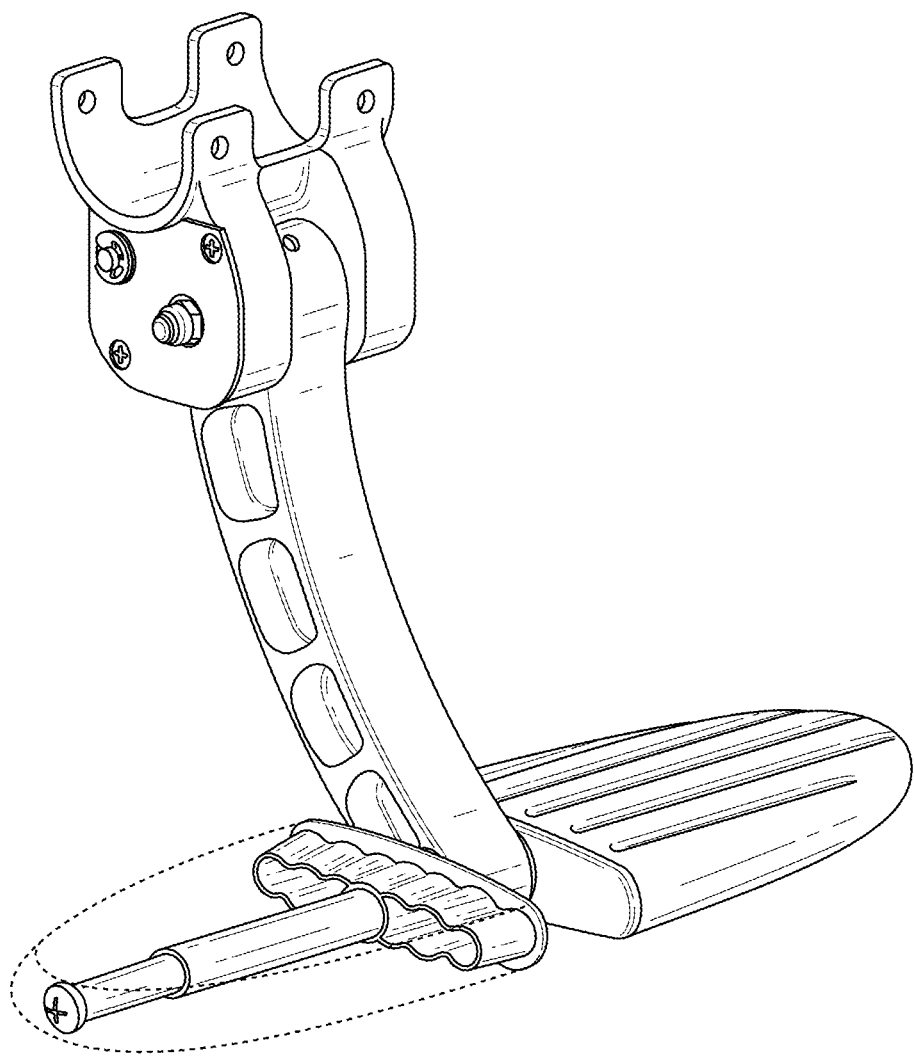
FIG. 1 is a prospective view of a conventional single post footrest assembly.
Figure 2:
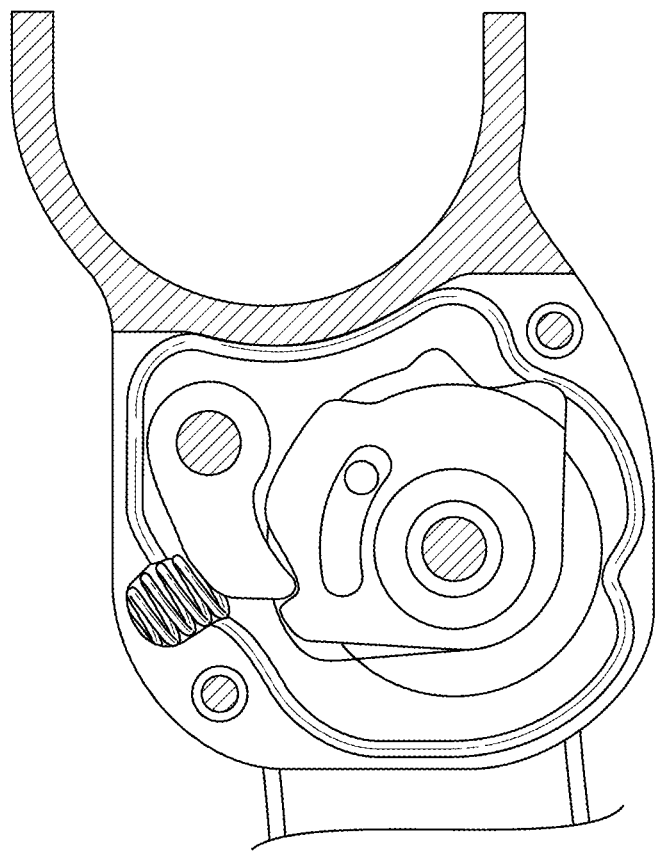
FIG. 2 is a cross-sectional view of the conventional single post footrest assembly of FIG. 1.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention provide video monitor assemblies for use with a passenger seat. While the video monitor assemblies are discussed for use with aircraft seats, they are by no means so limited. Rather, embodiments of the video monitor assemblies may be used in passenger seats or other seats of any type or otherwise as desired.

FIGS. 3-17 illustrate certain embodiments of a footrest assembly 10. The footrest assembly 10 comprises a fixed portion 12 and a deployable portion 14. The deployable portion 14 comprises a post 16 and a pair of paddles 18 coupled to a first end 20 of the post 16. The fixed portion 12 comprises a saddle 22, which is coupled to a second end 24 of the post 16.

In the fixed portion 12, the saddle 22 comprises an upper portion 26 configured to couple the footrest assembly 10 to a lower portion of a passenger seat 28. In the embodiments shown in FIGS. 3, 6, 11, 14, and 16, the upper portion 26 comprises a curved surface 30 that is shaped to mate with a base frame tube (not shown) of the passenger seat 28. In other embodiments, the upper portion 26 may include any suitable configuration or shape needed or desired to couple the footrest assembly 10 to the passenger seat 28 or any other suitable structure.

In certain embodiments, the saddle 22 comprises a lower portion 32 that is configured to pivotally couple to the first end 20 of the post 16. In some embodiments, as illustrated in FIGS. 3, 6-8, 11, 14, 16-17, the lower portion 32 comprises a pair of parallel surfaces 34 that extend from the curved surface 30 of the upper portion 26. In other embodiments, the lower portion 32 may comprise any suitable shape or design that provides a connection surface for pivotally mounting the post 16 to the saddle 22.

The parallel surfaces 34 may comprise a surface shape that resembles a "D", but may also have other suitable shapes such as rectilinear, triangular, circular, hexagonal, trapezoidal, or other suitable shapes. The overall size of the surfaces 34 shown in FIGS. 3, 6-8, 11, 14, 16-17 is not necessarily required for the design to properly function. Rather, a larger surface size for surfaces 34 may be used to provide pinch protection from the rotation of post 16.

A post coupling aperture 36 in each surface 34 provides a location for a fastener 38 to be inserted for coupling the two surfaces 34 to the first end 20 of the post 16. The post coupling aperture 36 may be shaped to substantially correspond to the shape of the fastener 38 or may have a larger shape that is configured to accommodate other components that may be coupled to the fastener 38, the post 16, and/or the saddle 22.

The upper portion 26 and/or the lower portion 32 of the saddle 22 may be formed of any suitable materials including but not limited to aluminum, other metals, composites, plastics, or other suitable materials that provide sufficient strength to support the footrest assembly 10.

Figure 3:
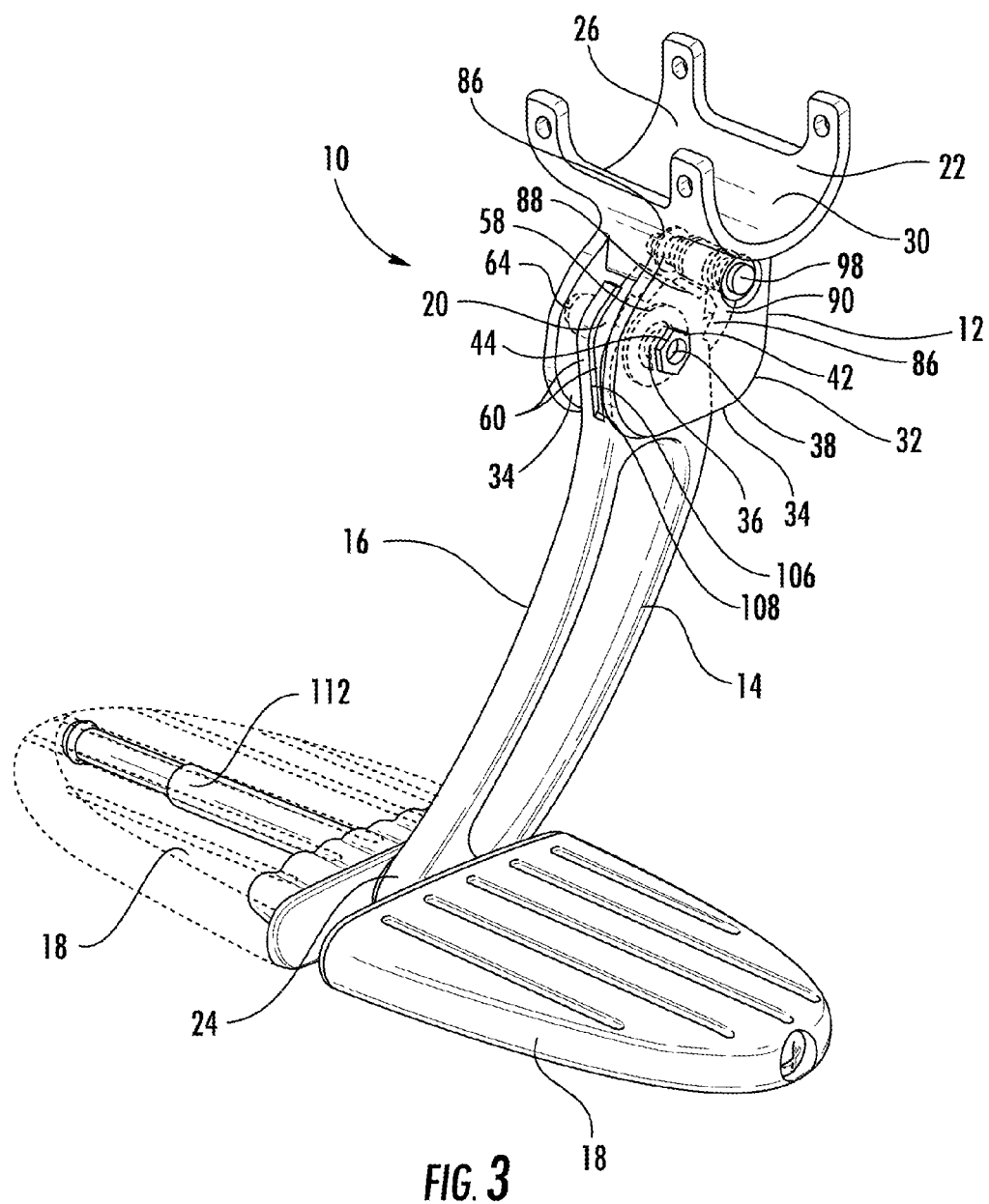
FIG. 3 is a prospective view of a footrest assembly according to certain aspects of the present invention.
Figure 4:
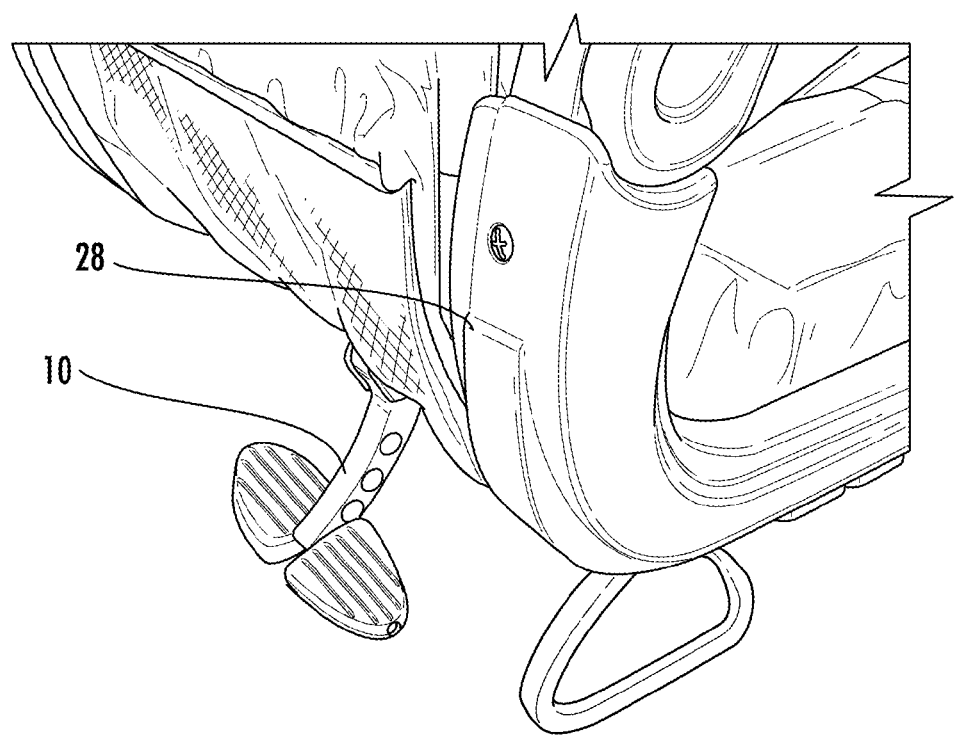
FIG. 4 is a prospective view of a footrest assembly according to certain embodiments of the present invention coupled to a passenger seat in a fully deployed position.
Figure 5:
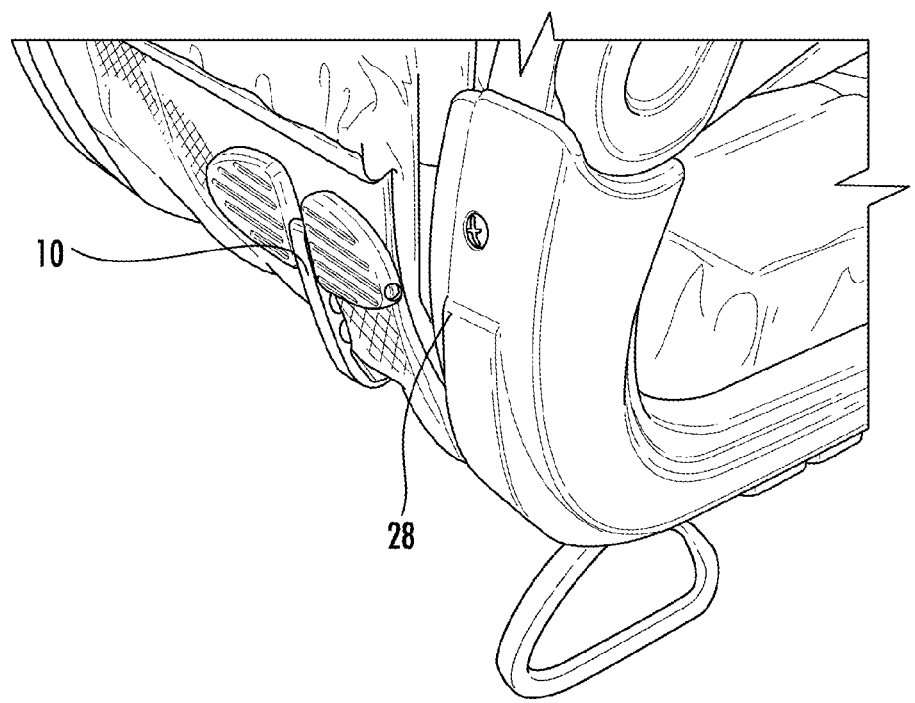
FIG. 5 is a prospective view of a footrest assembly according to certain embodiments of the present invention coupled to a passenger seat in a stowed position.

In certain embodiments, as shown in FIGS. 3-5 and 13-14, the post 16 may have an overall curvature in its longitudinal shape between the first end 20 and the second end 24. However, a person of ordinary skill in the relevant art will understand that the post 16 may have any suitable shape that allows the post 16 to rotate from a stowed position (adjacent the passenger seat 28 as shown in FIG. 5) to a fully deployed position (which corresponds to the locked position with respect to a tooth 88 farthest in rotation from the stowed position, as shown in FIG. 4, and which is described in detail below). The post 16 may have an "I" cross-sectional shape, as shown in FIGS. 3, 6, and 13-14, or may have a solid or hollow rectilinear, triangular, circular, hexagonal, trapezoidal, "T", or other suitable cross-sectional shape that provides sufficient stiffness and support for the deployable portion 14 of the footrest assembly 10.

The post 16 may be formed of any suitable materials including but not limited to aluminum, other metals, composites, plastics, or other suitable materials that provide sufficient strength to support the footrest assembly 10.

The first end 20 of the post 16 may include a saddle coupling aperture 40, a location for a fastener 38 to be inserted for coupling the first end 20 of the post 16 to the two surfaces 34. In certain embodiments, the saddle coupling aperture 40 may be shaped to substantially correspond to the shape of the fastener 38 or may have a larger shape that is configured to accommodate other components that may be coupled to the fastener 38, the post 16, and/or the saddle 22.

In certain embodiments, the first end 20 of the post 16 is configured to be inserted between the two parallel surfaces 34 so that the saddle coupling aperture 40 is sufficiently aligned with the post coupling apertures 36 so that the fastener 38 may be inserted through all three apertures to secure the post 16 to the saddle 22.

In some embodiments, as shown in FIGS. 3, 6-8, and 11, the fastener 38 may comprise a bolt 42, which is inserted through the post coupling apertures 36 on each surface 34 and the saddle coupling aperture 40 on the post 16. In these embodiments, one of the post coupling apertures 36 has a larger opening to receive a head 44 of the bolt 42, which then tapers to a smaller opening configured to allow a shaft 46 of the bolt 42 to pass through while preventing the head 44 from passing through the smaller opening.

The opposing post coupling aperture 36 has an opening that is shaped to allow the shaft 46 to pass through and may have a shape that is larger than the shaft 46 to accommodate other components that may be coupled to the bolt 42, the post 16, and/or the saddle 22.

Figure 6:
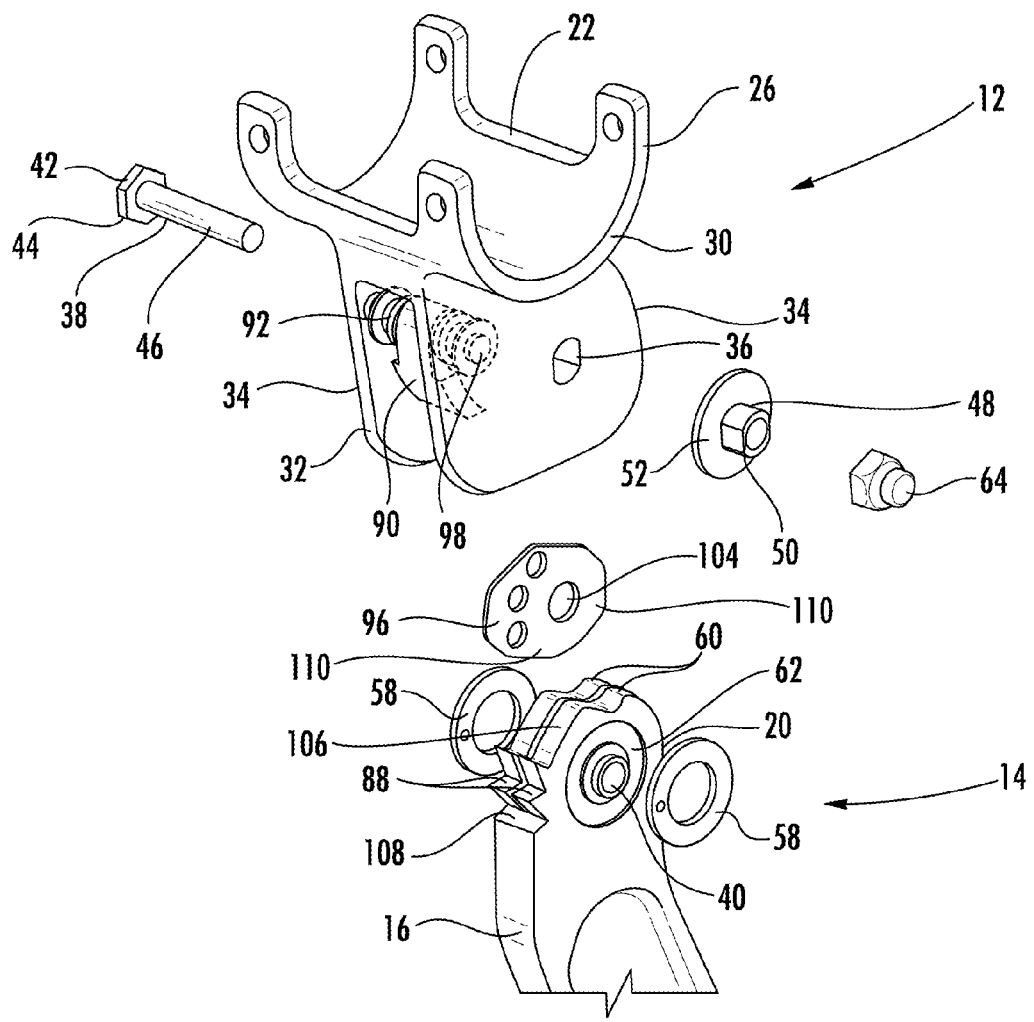
FIG. 6 is a exploded view of a portion of the footrest assembly of FIG. 3.
Figure 7:
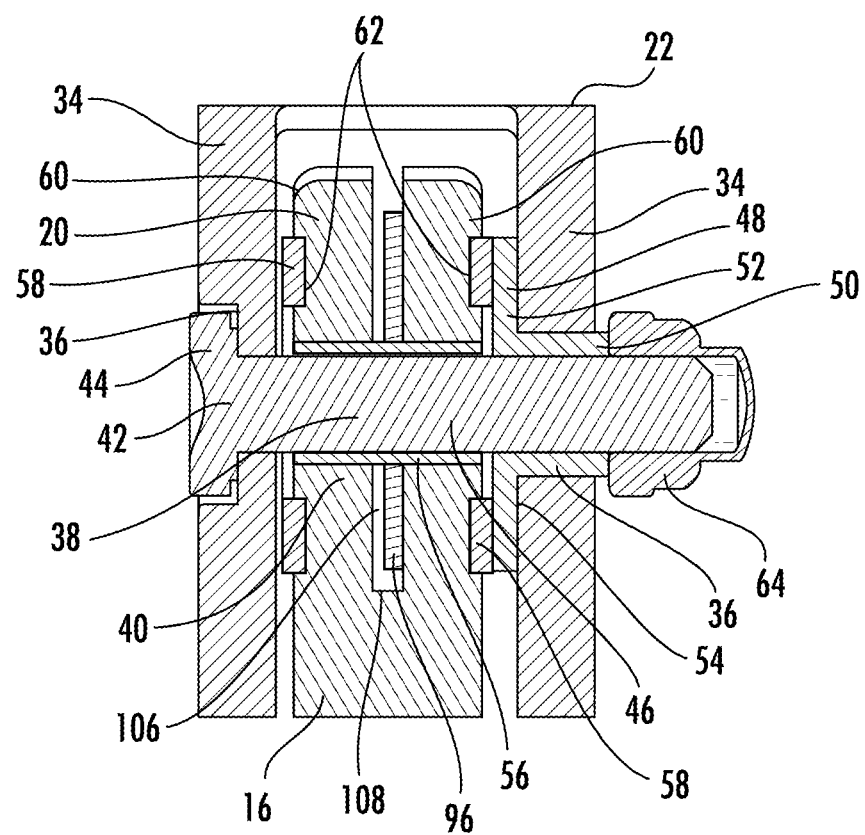
FIG. 7 is a cross-sectional forward view of a portion of the footrest assembly of FIG. 3.
Figure 8:
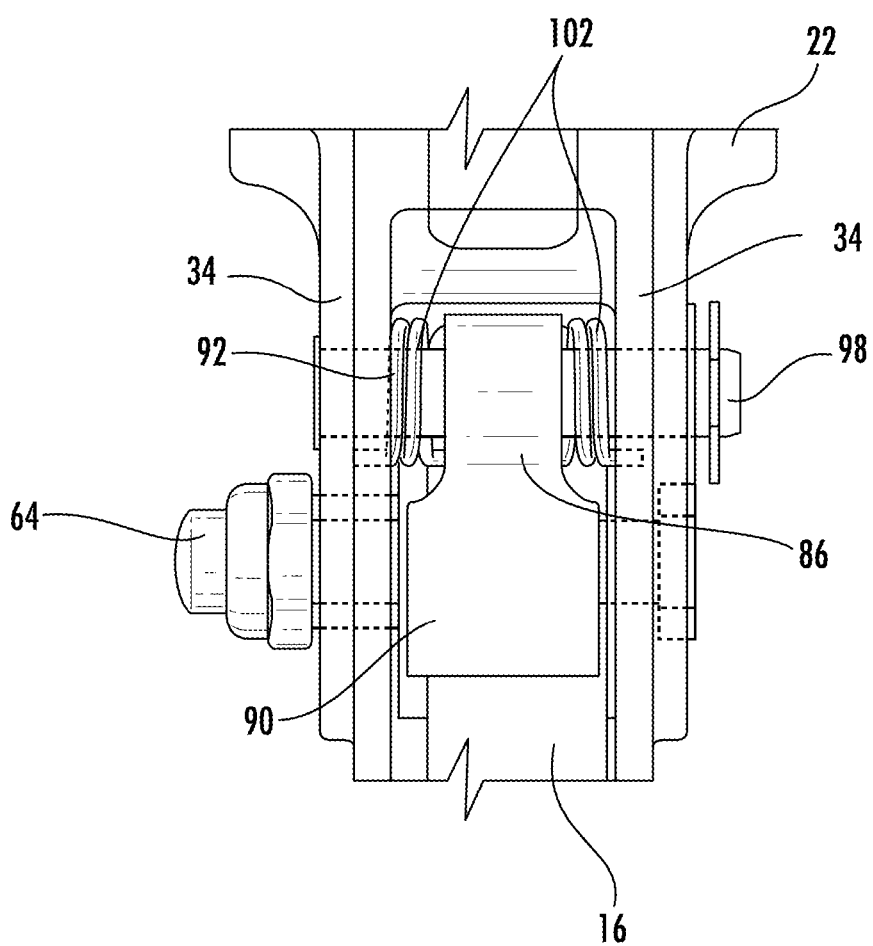
FIG. 8 is an aft view of a portion of the footrest assembly of FIG. 3.

In certain embodiments, as shown in FIGS. 6-7, at least one bushing 48 may be coupled to the opposing post coupling aperture 36. The bushing 48 may include a portion 50 shaped to fit within the post coupling aperture 36 and over the shaft 46, and a flange portion 52 shaped to fit against an interior side 54 of the surface 34 adjacent the post coupling aperture 36. The flange portion 52 is configured to bias the bushing 48 against the interior side 54 when the bolt 42 is secured to the saddle 22 and the post 16. The bushing 48 may be formed of aluminum, other metals, composites, plastics, or other suitable materials that provide sufficient strength to support the footrest assembly 10.

In these embodiments, the shaft 46 may comprise a smooth portion that is positioned within at least the saddle coupling aperture 40 of the post 16, and a threaded portion that extends through the opposing post coupling aperture 36. The bolt 42 may be formed of aluminum, other metals, composites, or other suitable materials that provide sufficient strength to support the footrest assembly 10. In certain embodiments, because the post 16 is configured to rotate about the fixed bolt 42, a cylindrical bushing 56 may be placed over at least the smooth portion of the shaft 46 that is positioned within the saddle coupling aperture 40 of the post 16 to provide a bearing surface for the rotary motion of the post 16.

Figure 17:
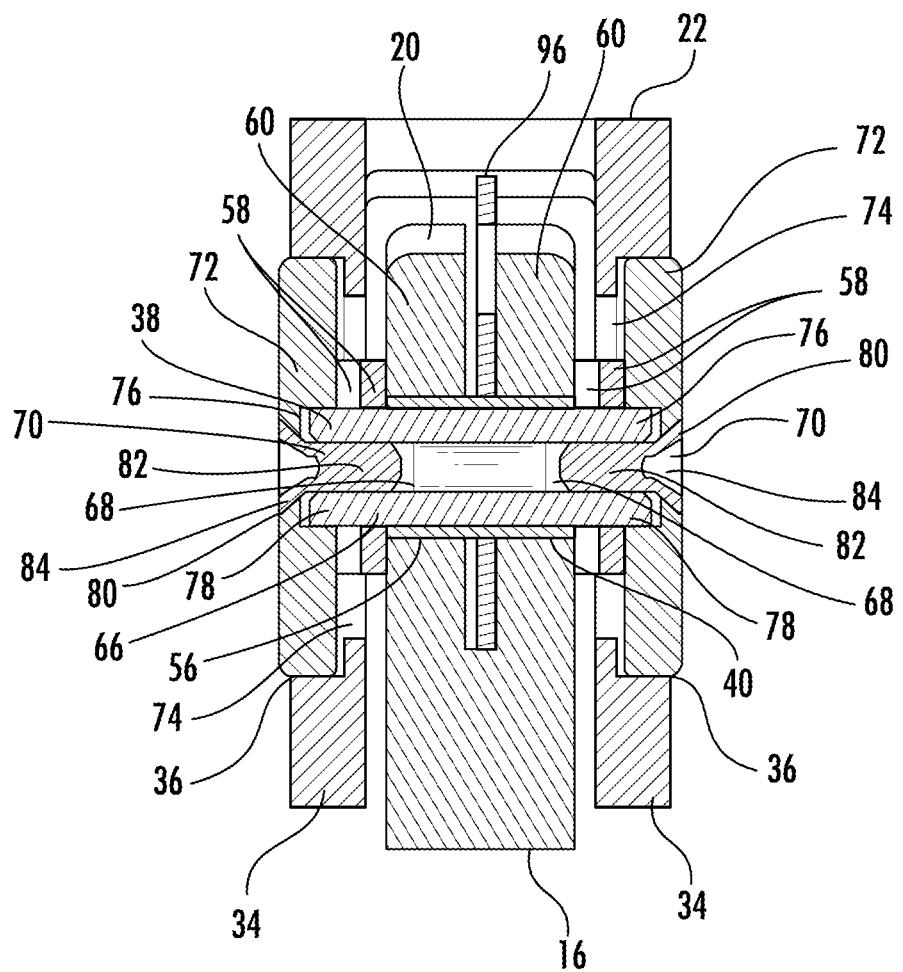
FIG. 17 is a cross-sectional forward view of a portion of the footrest assembly of FIG. 14.

In these embodiments, as shown in FIGS. 3 and 6-7, at least a pair of washers 58 may be positioned on the bolt 42 adjacent opposing sides 60 of the post 16. Each side 60 may further comprise a groove 62 that is shaped to receive at least a portion of the washer 58 thickness. However, in other embodiments, as shown in FIG. 17, it may be desirable to allow the washers 58 to move around the fastener 38. The groove 62 is configured to hold each washer 58 in position. The washers 58 may be formed of any suitable wear material that achieves the desired wear and tear characteristics, including but not limited to nylon and other materials designed for high wear resistance and aluminum contact so as to avoid the creation of particles when the aluminum wears from contact with the washers 58. Furthermore, to increase the amount of friction between the washers 58 and the post 16, washers 58 with larger surface areas may be used.

To secure the bolt 42, a nut 64 is connected to the threaded end of the shaft 46 that extends through the opposing post coupling aperture 36. Because the nut 64 is positioned adjacent the bushing 48 and the surface 34 of the saddle 22, the nut 64 does not directly contact a moving part (i.e., the post 16) and therefore does not loosen over time and repeated motion of the post 16.

Because the flange portion 52 is positioned against the interior side 54 when the bolt 42 is secured to the saddle 22 and the post 16, wear occurs between the bushing 48 and the saddle 22, and the torque between the washer 58 and the bushing 48 is not transferred to the saddle 22 so the saddle 22 is not twisted or deformed. Furthermore, the flange portion 52 and the interior side 54 are aligned consistently parallel to one another to ensure an evenly distributed pressure is applied to each washer 58.

To further ensure that no movement from the post 16 is transferred to the nut 64, the post coupling aperture 36 and an exterior shape of the portion 50 of the bushing 48 may comprise interlocking shapes. In the embodiments shown in FIG. 6, the interlocking shapes are "double D", meaning two capital letter Ds placed back to back with the curved surfaces opposing one another and connected by two parallel straight sides. One of ordinary skill in the art will understand that this is but one of many possible interlocking designs that may be used to secure the bushing 48 and prevent movement or vibration being transferred to the nut 64.

In certain embodiments, as shown in FIGS. 14-17, the fastener 38 may comprise a pivot shaft 66, which is inserted through the post coupling apertures 36 on each surface 34 and the saddle coupling aperture 40 on the post 16. In these embodiments, the pivot shaft 66 comprises a cylindrically shaped shaft with threaded apertures 68 at each end that are configured to couple to threaded fasteners 70. The pivot shaft 66 may be formed of aluminum, other metals, composites, or other suitable materials that provide sufficient strength to support the footrest assembly 10.

In certain embodiments, because the post 16 is configured to rotate about the fixed pivot shaft 66, the cylindrical bushing 56 may be placed over at least a portion of the pivot shaft 66 that is positioned within the saddle coupling aperture 40 of the post 16 to provide a bearing surface for the rotary motion of the post 16.

A cover 72 is then inserted into the post coupling aperture 36 on each surface 34. In these embodiments, the post coupling aperture 36 in each surface 34 is shaped to receive the cover 72, but includes an interior ledge 74 that prevents the cover 72 from passing through the post coupling aperture 36. The cover 72 may be formed of aluminum, other metals, composites, plastics, or other suitable materials designed for high wear resistance.

The cover 72 also includes a recess 76 that is configured to receive an end 78 of the pivot shaft 66. A fastener aperture 80 is positioned within the cover 72 that aligns with the location of the threaded aperture 68 in the end 78 of the pivot shaft 66. The fastener aperture 80 has a larger opening to receive a head 84 of the fastener 70, which then tapers to a smaller opening configured to allow a shaft 82 of the fastener 70 to pass through while preventing the head 84 from passing through the smaller opening. The fastener 70 is then coupled to the threaded aperture 68. As a result, the cover 72 is biased against the interior ledge 74 of the post coupling aperture 36 when each fastener 70 is secured to the pivot shaft 66.

In these embodiments, the pair of washers 58 may be positioned on the pivot shaft 66 adjacent the opposing sides 60 of the post 16 so that the washers 58 are sandwiched between the side 60 and the cover 72.

In these embodiments, the cover 72 is a bushing, which applies pressure to the washers 58 to apply friction to the post 16 so that it will not move unless an external force is applied. Because the cover 72 is biased against the interior ledge 74 of the post coupling aperture 36, the surfaces of the interior ledge 74 and the cover 72 should be aligned consistently parallel to one another to ensure an evenly distributed pressure is applied to each washer 58. Because of the biasing arrangement between the saddle 22 and the cover 72, the torque between the cover 72 and the washer 58 is transferred to the saddle 22, which could result in the saddle 22 becoming twisted or deformed in certain instances.

In certain embodiments, as illustrated in FIGS. 3-17, to control the movement of the deployable portion 14 between the stowed position and the fully deployed position, a ratcheting mechanism 86 may be incorporated into the footrest assembly 10. The ratcheting mechanism components are positioned in the center of the of the coupling between the post 16 and the saddle 22 to provide stability to the single post design by ensuring that the force is evenly applied to the post 16. The ratcheting mechanism 86 comprises at least one tooth 88, at least one pawl 90, at least one spring 92, and a cam follower 96.

Figure 13:
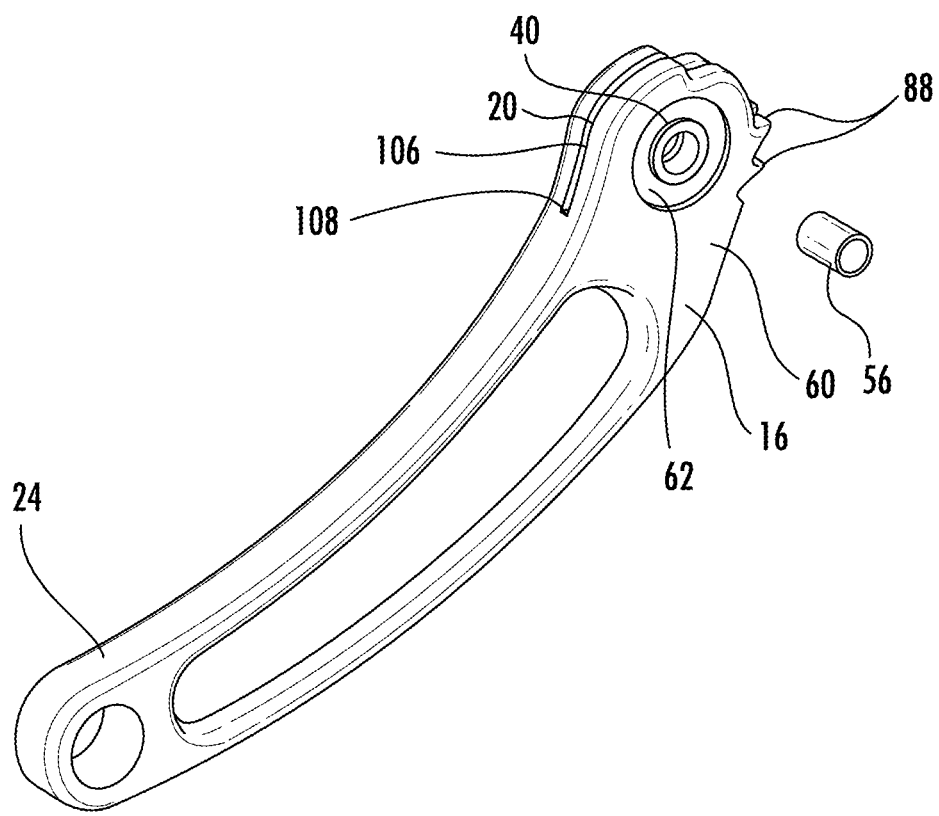
FIG. 13 is an exploded view of a post for use with a footrest assembly according to certain embodiments of the present invention.
Figure 14:
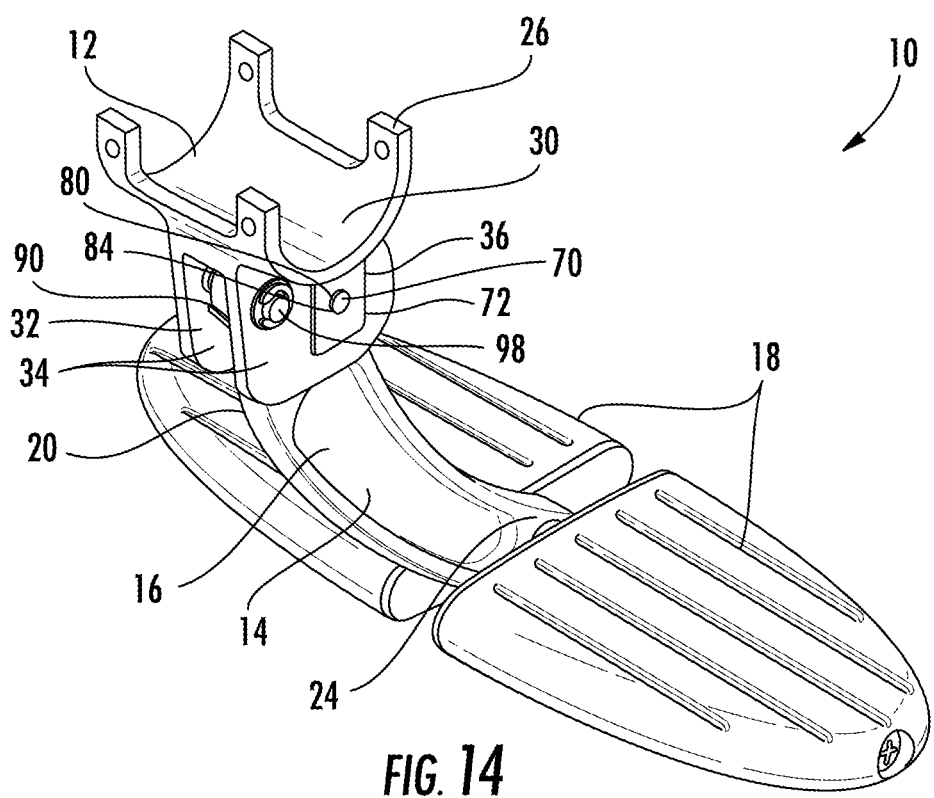
FIG. 14 is a perspective view of a footrest assembly according to certain embodiments of the present invention.
Figure 15:
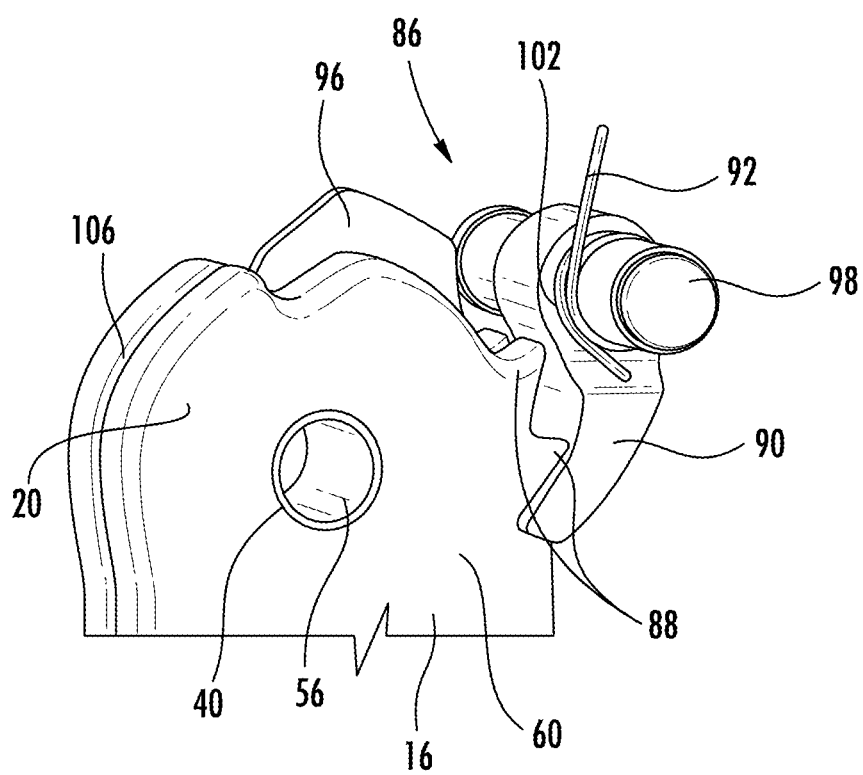
FIG. 15 is a perspective view of a portion of the footrest assembly of FIG. 14.
Figure 16:
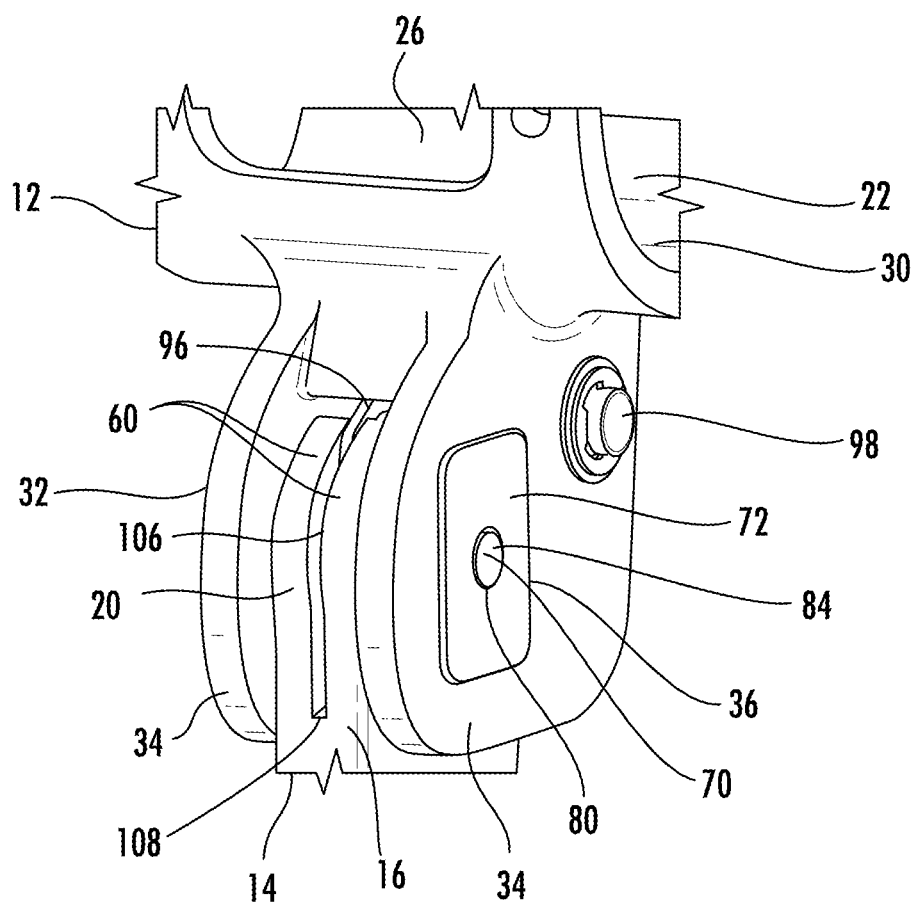
FIG. 16 is a forward view of a portion of the footrest assembly of FIG. 14.

In these embodiments, as best illustrated in FIGS. 6, 13, and 15, the teeth 88 may be integrated directly into the first end 20 of the post 16. The teeth 88 may be integrally formed with the first end 20 or may be coupled to the first end 20 via any suitable mechanical or chemical means. The teeth 88 therefore may be formed of the same or different materials as the post 16.

The pawl 90, which is a spring-loaded finger as shown in FIGS. 3, 6, 8, 14, and 15, may be pivotally coupled to a pawl shaft 98. The pawl shaft 98 may be fixedly coupled to the surfaces 34 in a location proximate the first end 20 of the post 16 so that the pawl 90 may engage the teeth 88 as the first end 20 of the post 16 rotates about the fastener 38. In certain embodiments, the pawl 90 may be formed of ¼ inch steel, other metals, composites, or other suitable materials.

Figure 9:
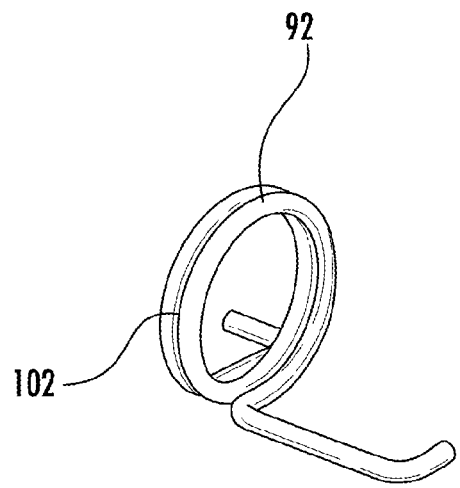
FIG. 9 is a perspective view of certain embodiments of a spring for use with a footrest assembly according to certain embodiments of the present invention.
Figure 10:
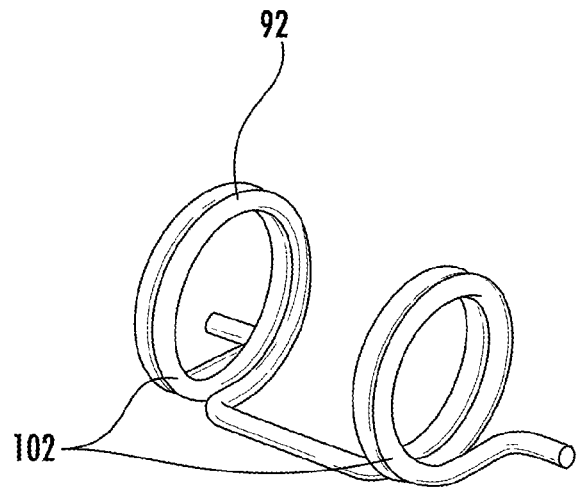
FIG. 10 is a perspective view of certain additional embodiments of a spring for use with a footrest assembly according to certain embodiments of the present invention.

A spring 92 may also be coupled to the pawl shaft 98 to provide the force required for the pawl 90 to releasably engage the teeth 88. In some embodiments, as shown in FIGS. 3, 6, 8-10, and 15, the spring 92 is a coiled spring. However, one of ordinary skill in the relevant art will understand that any suitable type or design of spring may be used that applies a suitable amount of force on the pawl 90. In the embodiments that utilize a coiled spring 92, the spring 92 may have one or more coils 102 located on one side of the pawl 90 (as shown in FIG. 9) or may comprise two or more coils 102 equally distributed on each side of the pawl 90 (as shown in FIG. 10). In certain embodiments, an even distribution of the coils 102 on each side of the pawl 90 may provide a better balance to the spring 92, which may result in better reliability and stability of the post 16. In additional embodiments, the balanced spring 92 embodiments may eliminate the need for a cylindrical bushing between the pawl 90 and the pawl shaft 98.

The spring 92 forces the pawl 90 to engage the teeth 88 as the first end 20 rotates proximate the pawl 90. The ratchet mechanism is supplied by the shape of the teeth 88, which are configured with a gentle slope on one side that allows the pawl 90 to slide over the teeth 88 when the first end 20 rotates in the direction of the stowed position, but are configured with a steep slope on the other side that locks against the pawl 90 when the first end 20 rotates in the direction of the fully deployed position.

Thus, controlled rotation of the deployable portion 14 from the fully deployed position to the stowed position is provided by the interaction between the teeth 88 and the pawl 90. Each tooth 88 provides a new locked location for the footrest assembly 10 providing adjustable support at each position between the tooth 88 that corresponds to the fully deployed position and the last tooth 88 encountered by the pawl 90 before the deployable portion 14 reaches the fully stowed position.

To return the deployable portion 14 from the stowed position (shown in FIG. 5) to the fully deployed position (as shown in FIG. 4 or any of the deployed positions that correspond to one of the teeth 88 located between the teeth 88 located farthest in rotation from the stowed position), a mechanism is needed to prevent the pawl 90 from engaging the teeth 88 until the desired deployed position is reached. In other words, a mechanism that holds the pawl 90 away from the steep slope of each tooth 88 is needed to allow the first end 20 to rotate in the direction of the fully deployed position. The cam follower 96 is configured to perform this function.

In certain embodiments, as illustrated in FIGS. 6, 7, 12, 15, and 17, the cam follower 96 may be a plate that includes a pivot aperture 104, which is shaped to receive the fastener 38 so that the cam follower 96, like the first end 20, is pivotally coupled to the fastener 38. The post 16 further includes a slot 106 enclosed by the two sides 60 and cam engaging surface 108. The slot 106 is shaped to accommodate the thickness of the cam follower 96.

In some embodiments, the cam follower 96 has an irregular shape that includes two locking sides 110. The locking sides 110 are configured to contact the cam engaging surface 108 during certain portions of the rotational path of the first end 20. Thus, when one of the locking sides 110 contacts the cam engaging surface 108, the rotation of the cam follower 96 is controlled by the rotation of the first end 20, thus the cam follower 96 is "coupled" to the first end 20. However, when neither of the locking sides 110 contacts the cam engaging surface 108, the first end 20 rotates independently of the cam follower 96, thus the cam follower 96 is "decoupled" from the first end 20.

The placement at least one of the locking sides 110, the overall shape, and the placement of the pivot aperture 104 are used to ensure that the cam follower 96 is positioned in the proper location of the rotational path of the first end 20 to disengage the pawl 90 from the teeth 88. In some embodiments, the additional locking side 110 may be included to ensure that the cam follower 96 returns to the proper location for the next rotation from the stowed position to the deployed position.

In certain embodiments, the cam follower 96 may be formed of ¼ inch steel, other metals, composites, or other suitable materials. The edges of the cam follower 96 that are configured to contact the pawl 90 may be rounded or otherwise shaped to minimize the number of sharp angles that contact the pawl 90 to reduce wear on the pawl 90 and provide a smoother operation. In some embodiments, the cam follower 96 may have a 0.5 inch thickness to reduce the overall weight of the footrest assembly 10, but may have up to at least a 0.63 inch thickness.

Figure 11:
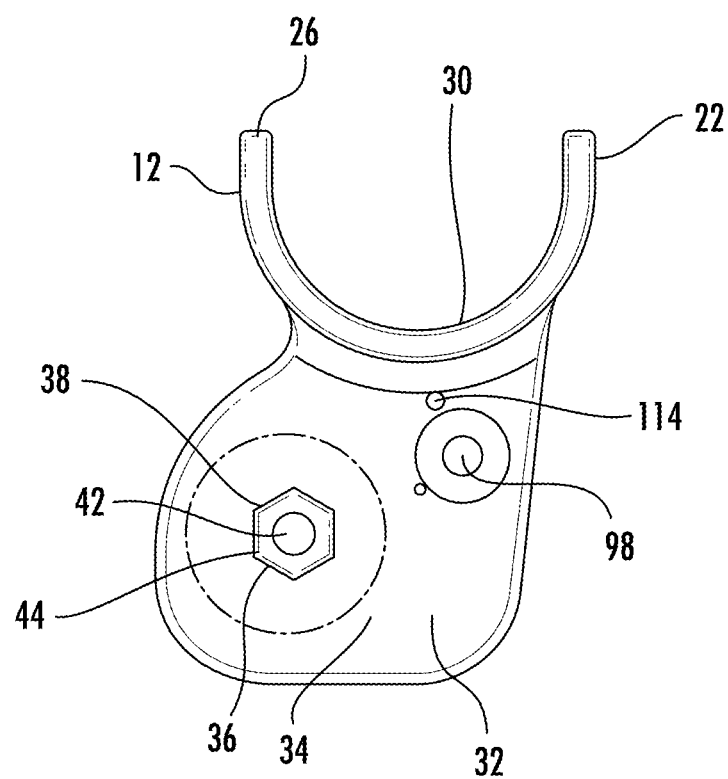
FIG. 11 is a side view of a portion of the footrest assembly of FIG. 3 showing an alternative location for the spring.
Figure 12:
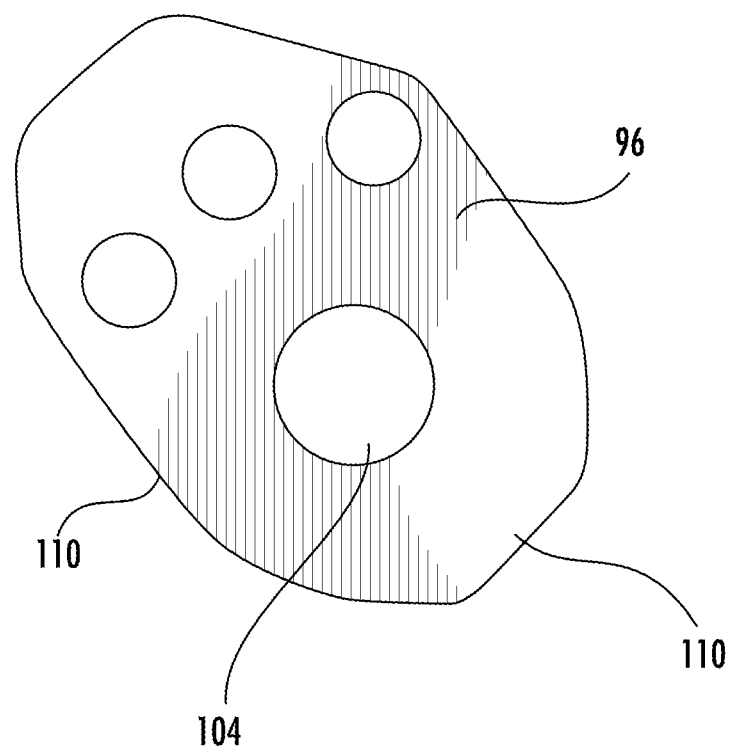
FIG. 12 is a top view of a cam follower for use with a footrest assembly according to certain embodiments of the present invention.

During testing, after about 2000 cycles, certain early versions of the footrest assembly 10 demonstrated that the spring 92 was not strong enough to engage the cam follower 96. The spring 92 was moved to a new spring position 114, as shown in FIG. 11, to provide more pressure on the pawl 90. The revised spring position provided improved results, but was not completely reliable after about 10,000 cycles. The spring design was then revised to a symmetrical design (as described above and shown in FIGS. 3, 6, 8, 10), to provide a more balanced and reliable design. Further test results with the symmetrical spring design did not exhibit further issues.

The paddles 18 are attached to opposing ends of a shaft 112 that passes through the second end 24 of the post 16. The paddles 18 may be formed of any suitable plastic, composite, metal or other lightweight material that provides sufficient strength to withstand repeated use.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A footrest assembly for a passenger seat comprising:
   (a) a fixed portion comprising an upper portion configured to couple to the passenger seat and a lower portion comprising a pair of parallel surfaces;
   (b) a deployable portion comprising a post;
   (c) a fastener fixedly coupled to the pair of parallel surfaces and passing through an aperture in an end of the post, wherein the post is pivotally coupled to the fastener;
   (d) a ratcheting mechanism comprising at least one tooth positioned on the end of the post and a pawl pivotally coupled to a pawl shaft fixedly coupled to the pair of parallel surfaces; and
   (e) a cam follower pivotally coupled to the fastener and positioned within a slot formed in the end of the post, wherein:
   the slot comprises a cam engaging surface and the cam follower comprises at least one locking side;
   in a coupled configuration, rotation of the cam follower is controlled by rotation of the post when the cam engaging surface contacts the at least one locking side; and
   in a decoupled configuration, rotation of the post occurs independently of the cam follower when the cam engaging surface does not contact the at least one locking side.

2. The footrest assembly of claim 1, further comprising at least one bushing, wherein a portion of the at least one bushing is inserted within an aperture in at least one of the pair of parallel surfaces, wherein an outer shape of the portion of the at least one bushing is configured to interlock with an inner shape of the aperture.

3. The footrest assembly of claim 2, wherein the at least one bushing comprises a flange portion configured to be positioned adjacent an interior side of one of the pair of parallel surfaces.

4. The footrest assembly of claim 2, wherein the fastener is a bolt and is secured to the pair of parallel surfaces with a nut positioned proximate the at least one bushing.

5. The footrest assembly of claim 1, wherein the at least one locking side of the cam follower comprises at least two locking sides.

6. The footrest assembly of claim 1, further comprising a spring coupled to the pawl shaft that is configured to apply force to engage the pawl with the at least one tooth to prevent rotation of the post in a direction of a fully deployed position, and the cam follower is configured to apply force to disengage the pawl from the at least one tooth to allow rotation of the post from a stowed position to the fully deployed position.

7. The footrest assembly of claim 1, further comprising at least a pair of washers, wherein each washer is positioned within a groove on each side of opposing sides of the end of the post.

8. A footrest assembly for a passenger seat comprising:
   (a) a fixed portion comprising a pair of parallel surfaces;
   (b) a deployable portion comprising a post;
   (c) a fastener fixedly coupled to the pair of parallel surfaces and passing through an aperture in an end of the post, wherein the post is pivotally coupled to the fastener;
   (d) at least a pair of washers, each washer positioned adjacent opposing sides of the end of the post;
   (e) at least one bushing positioned adjacent one of the washers;
   (f) a ratcheting mechanism comprising at least one tooth positioned on the end of the post and a pawl pivotally coupled to a pawl shaft fixedly coupled to the pair of parallel surfaces; and
   (g) a cam follower pivotally coupled to the fastener and positioned within a slot formed in the end of the post, wherein:
   the slot comprises a cam engaging surface and the cam follower comprises at least two locking sides;
   in a coupled configuration, rotation of the cam follower is controlled by rotation of the post when the cam engaging surface contacts one of the at least two locking sides; and
   in a decoupled configuration, rotation of the post occurs independently of the cam follower when the cam engaging surface does not contact either of the at least two locking sides.

9. The footrest assembly of claim 8, wherein a portion of the at least one bushing is inserted within an aperture in at least one of the pair of parallel surfaces, wherein an outer shape of the portion of the at least one bushing is configured to interlock with an inner shape of the aperture.

10. The footrest assembly of claim 8, wherein the at least one bushing comprises a flange portion configured to be positioned adjacent an interior side of one of the pair of parallel surfaces.

11. The footrest assembly of claim 8, further comprising a spring coupled to the pawl shaft that is configured to apply force to engage the pawl with the at least one tooth to prevent rotation of the post in a direction of a fully deployed position, and the cam follower is configured to apply force to disengage the pawl from the at least one tooth to allow rotation of the post from a stowed position to the fully deployed position.

12. The footrest assembly of claim 8, wherein the fastener is a bolt and is secured to the pair of parallel surfaces with a nut positioned proximate the at least one bushing.

13. The footrest assembly of claim 8, wherein each washer is positioned within a groove on each of the opposing sides of the end of the post.

14. A footrest assembly for a passenger seat comprising:
(a) a saddle;
(b) a post, wherein an end of the post is pivotally coupled to a fastener connected to the saddle;
(c) at least one bushing coupled to the fastener, wherein a portion of the at least one bushing is inserted within an aperture in the saddle, wherein an outer shape of the portion of the at least one bushing is configured to interlock with an inner shape of the aperture;
(d) a ratcheting mechanism comprising at least one tooth positioned on the end of the post and a pawl pivotally coupled to a pawl shaft fixedly coupled to the saddle; and
(e) a cam follower pivotally coupled to the fastener and positioned within a slot formed in the end of the post, wherein:
the slot comprises a cam engaging surface and the cam follower comprises at least one locking side;
in a coupled configuration, rotation of the cam follower is controlled by rotation of the post when the cam engaging surface contacts the at least one locking side; and
in a decoupled configuration, rotation of the post occurs independently of the cam follower when the cam engaging surface does not contact the at least one locking side.

15. The footrest assembly of claim 14, wherein the at least one bushing comprises a flange portion configured to be positioned adjacent an interior side of the saddle.

16. The footrest assembly of claim 14, wherein the at least one locking side of the cam follower comprises at least two locking sides.

17. The footrest assembly of claim 14, further comprising a spring coupled to the pawl shaft that is configured to apply force to engage the pawl with the at least one tooth to prevent rotation of the post in a direction of a fully deployed position, and the cam follower is configured to apply force to disengage the pawl from the at least one tooth to allow rotation of the post from a stowed position to the fully deployed position.

18. The footrest assembly of claim 14, wherein the fastener is a bolt and is secured to the saddle with a nut positioned proximate the at least one bushing.

19. The footrest assembly of claim 14, further comprising a pair of washers, wherein each washer is positioned within a groove on each side of the end of the post.

* * * * *